(12) United States Patent
Edamana et al.

(10) Patent No.: US 11,641,022 B2
(45) Date of Patent: May 2, 2023

(54) CONTROLLING PURGE OPERATION FOR FUEL CELL ASSEMBLY

(71) Applicant: GM GLOBAL TECHNOLOGY OPERATIONS LLC, Detroit, MI (US)

(72) Inventors: Biju Edamana, West Bloomfield, MI (US); Aaron R. Rogahn, Davisburg, MI (US); Michael D. Cartwright, Oxford, MI (US); Manish Sinha, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 208 days.

(21) Appl. No.: 17/140,551

(22) Filed: Jan. 4, 2021

(65) Prior Publication Data

US 2022/0216490 A1   Jul. 7, 2022

(51) Int. Cl.
*H01M 8/04228* (2016.01)
*H01M 8/04492* (2016.01)
*H01M 8/0432* (2016.01)
*H01M 8/04225* (2016.01)

(52) U.S. Cl.
CPC ... *H01M 8/04228* (2016.02); *H01M 8/04225* (2016.02); *H01M 8/04358* (2013.01); *H01M 8/04492* (2013.01)

(58) Field of Classification Search
None
See application file for complete search history.

(56) References Cited

U.S. PATENT DOCUMENTS

| 8,900,766 | B2 | 12/2014 | Rogahn et al. | |
| 9,070,921 | B2 | 6/2015 | Cartwright et al. | |
| 2014/0093801 | A1* | 4/2014 | Rogahn | H01M 8/04225 429/429 |
| 2021/0328243 | A1* | 10/2021 | Namba | H01M 8/04701 |

\* cited by examiner

*Primary Examiner* — Haroon S. Sheikh
(74) *Attorney, Agent, or Firm* — Quinn IP Law

(57) ABSTRACT

A system for controlling purge operation of a fuel cell assembly includes a controller and one or more sensors configured to obtain respective sensor data. The fuel cell stack is configured to receive a stack coolant. The controller is configured to execute a first purge mode when at least one of a first enabling condition and a second enabling condition is met. The first purge mode defines a first group of setpoints, including a relatively low cathode stoichiometric ratio. The controller is configured to switch to a second purge mode when the coolant temperature is above a minimum warm-up temperature and a third mode when a relative humidity value of a stack cathode output falls below a threshold humidity. The second purge mode defines a second group of setpoints, including a relatively high cathode stoichiometric ratio.

17 Claims, 3 Drawing Sheets

CONTROLLING PURGE OPERATION FOR FUEL CELL ASSEMBLY

INTRODUCTION

The disclosure relates generally to controlling a purge operation for a fuel cell assembly. A fuel cell is an electro-mechanical cell that converts the chemical energy of a fuel (such as hydrogen) and an oxidizing agent (such as oxygen) into power through chemical reactions. A device, such as a vehicle, may include a fuel cell stack with a plurality of cells combined to generate a specific level of power. An example of a fuel cell is a proton exchange membrane fuel cell, which includes a solid polymer electrolyte proton-conducting membrane positioned between an anode and a cathode. The fuel cell stack needs to have a certain humidity level so that the ionic resistance across the membranes is low enough to effectively conduct protons. However, too much water in the stack may cause problems for low temperature environments where freezing of the water could produce ice that blocks flow channels. In other words, a delicate balance is needed in order for the fuel cell stack to function efficiently and durably.

SUMMARY

Disclosed herein is a system for controlling a purge operation in a fuel cell assembly. The system includes a fuel cell stack configured to receive a stack coolant. One or more sensors are configured to obtain respective sensor data, including a coolant temperature of the stack coolant and an ambient temperature. A controller is in communication with the one or more sensors and has a processor and a tangible, non-transitory memory on which instructions are recorded. Execution of the instructions by the processor causes the controller to execute a first purge mode when at least one of a first enabling condition and a second enabling condition is met. The first purge mode defines a first group of setpoints, including a relatively low cathode stoichiometric ratio.

The controller is configured to switch to a second purge mode when the coolant temperature is above a minimum warm-up temperature. The second purge mode defines a second group of setpoints, including a relatively high cathode stoichiometric ratio. The controller is configured to switch to a third mode when a relative humidity value of a stack cathode output falls below a threshold humidity. In some embodiments, the relatively low cathode stoichiometric ratio is about 0.9 to 1.1 and the relatively high cathode stoichiometric ratio is about 9.5 to 10.5.

In some embodiments, the minimum warm-up temperature is about 85 degrees Celsius. The first enabling condition may be met when the ambient temperature at a shutdown of the device is less than an ambient threshold temperature. In one example, the ambient threshold temperature is about −12 to −18 degrees Celsius. The second enabling condition may be met when the coolant temperature at a wakeup of the fuel cell assembly is less than a minimum coolant temperature. In one example, the minimum coolant temperature is about 3 degrees Celsius to 7 degrees Celsius.

The first group of setpoints and the second group of setpoints include a respective current setpoint, a respective stack airflow setpoint, and a respective compressor airflow setpoint. In some embodiments, the respective current setpoint is about 55 to 65 amperes for the first purge mode and about 35 to 45 amperes for the second purge mode. The respective stack airflow setpoint may be about 3 to 7 grams per second for the first purge mode and about 45 to 55 grams per second for the second purge mode. The respective compressor airflow setpoint for both the first purge mode and the second purge mode may be about 45 to 55 grams per second.

The system may include a current density circuit board adapted to generate a current distribution through the fuel cell stack from an inlet end to an outlet end. The current distribution is employed to set calibration values for the first group of setpoints and the second group of setpoints. The system may include a high frequency resistance circuit adapted to generate respective resistance measurements of respective membranes in the fuel cell stack. The respective resistance measurements are employed to set respective calibration values for the first group of setpoints and the second group of setpoints.

Disclosed herein is a method for controlling a purge operation of a fuel cell assembly having a fuel cell stack configured to receive a stack coolant, one or more sensors and a controller having a processor and a tangible, non-transitory memory. The method includes obtaining respective sensor data, via the one or more sensors, including a coolant temperature of the stack coolant and an ambient temperature. A first purge mode is executed, via the controller, when at least one of a first enabling condition and a second enabling condition is met, the first purge mode defining a first group of setpoints, including a relatively low cathode stoichiometric ratio. The method includes switching to a second purge mode when the coolant temperature is above a minimum warm-up temperature, the second purge mode defining a second group of setpoints, including a relatively high cathode stoichiometric ratio, via the controller. The method includes switching to a third mode when a relative humidity value of a stack cathode output falls below a threshold humidity, via the controller.

The method may include selecting the relatively low cathode stoichiometric ratio to be about 0.8 to 1.2, the relatively high cathode stoichiometric ratio to be about 9.5 to 10.5 and the minimum warm-up temperature to be about 83 to 87 degrees Celsius. In some embodiments, the first enabling condition is met when the ambient temperature at a shutdown of the fuel cell assembly is less than an ambient threshold temperature. In some embodiments, the second enabling condition is met when the coolant temperature at a wakeup of the fuel cell assembly is less than a minimum coolant temperature, the minimum coolant temperature being about 3 to 7 degrees Celsius.

The method may include generating a current distribution through the fuel cell stack from an inlet end to an outlet end, via a current density circuit board, and employing the current distribution to set respective calibration values for the first group of setpoints and the second group of setpoints. The method may include generating respective resistance measurements of respective membranes in the fuel cell stack, via a high frequency resistance circuit, and employing the respective resistance measurements to set respective calibration values for the first group of setpoints and the second group of setpoints.

The above features and advantages and other features and advantages of the present disclosure are readily apparent from the following detailed description of the best modes for carrying out the disclosure when taken in connection with the accompanying drawings.

DETAILED DESCRIPTION

Figure 1:
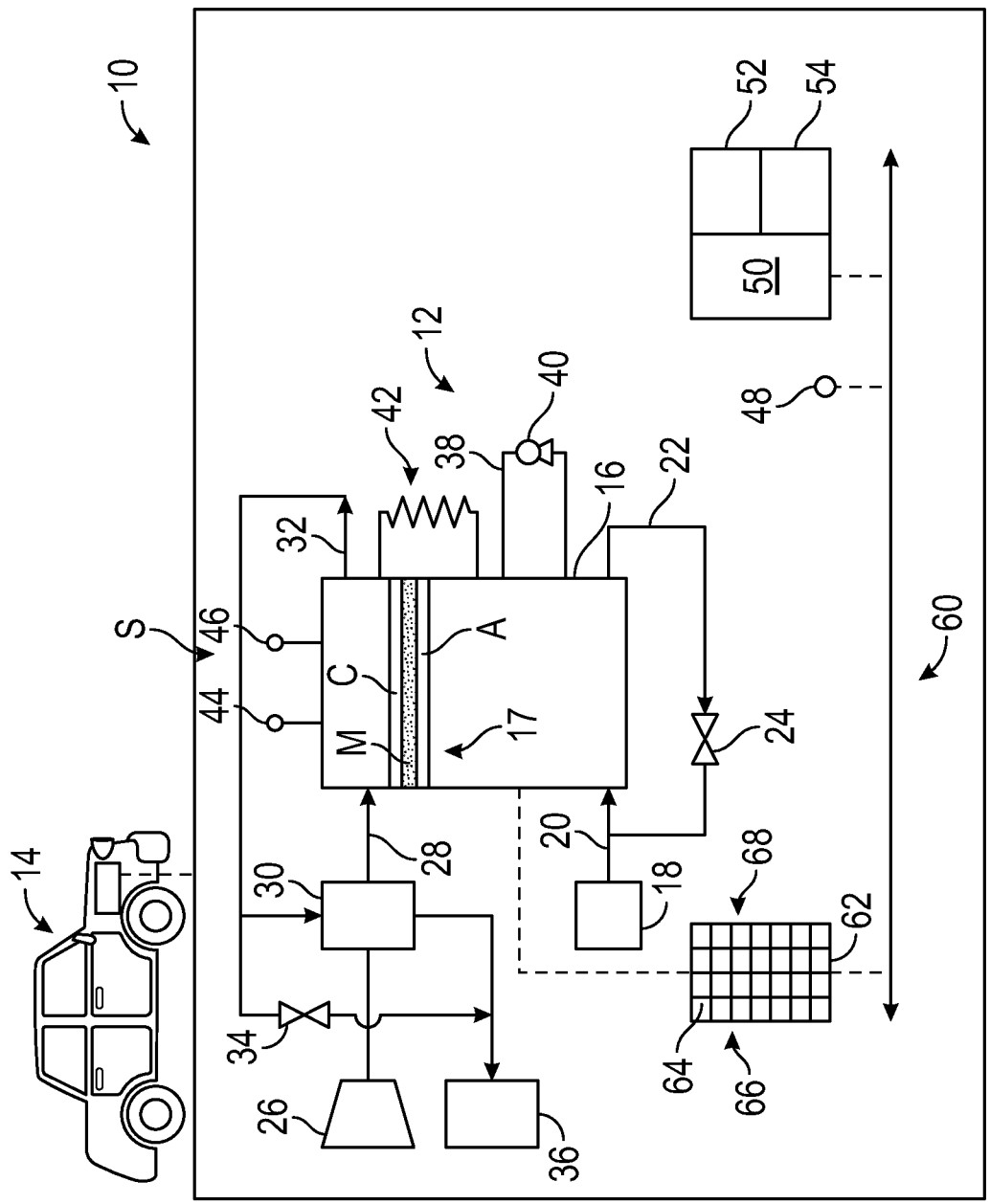
FIG. 1 is a schematic view of a system for controlling a purge operation of a fuel cell assembly, the system having a controller.

Referring to the drawings, wherein like reference numbers refer to like components, FIG. 1 schematically illustrates a system 10 for controlling operation of a fuel cell assembly 12 having a fuel cell stack 16. The fuel cell assembly 12 may be part of a device 14. The device 14 may be a mobile platform, such as, but not limited to, a passenger vehicle, sport utility vehicle, light truck, heavy duty vehicle, ATV, minivan, bus, transit vehicle, bicycle, moving robot, farm implement (e.g., tractor), sports-related equipment (e.g., golf cart), boat, airplane and train. The device 14 may be a non-mobile platform, including but not limited to, an electronic/computing device and manufacturing equipment. It is to be understood that the device 14 may take many different forms and have additional components. It is understood that the FIGS. are not to scale.

Referring to FIG. 1, the fuel cell stack 16 includes multiple membrane electrode assemblies 17 stacked together, each having a respective membrane M sandwiched between a respective anode A and a respective cathode C. It is understood that the membrane electrode assemblies 17 may include other layers or fillers not shown. Referring to FIG. 1, the fuel cell stack 16 receives a hydrogen reactant gas from a source 18 that flows into an anode side of the fuel cell stack 16, via an anode input line 20. The hydrogen gas is dissociated at the respective anode A to generate free protons and electrons. The protons pass through the respective membrane M to the respective cathode C. The fuel cell stack 16 produces an anode exhaust gas, which is removed through an anode output line 22. The fuel cell assembly 12 may include a bleed valve 24 to regulate the removal of the anode exhaust gas.

Referring to FIG. 1, a compressor 26 is adapted to provide air flow to a cathode side of the fuel cell stack 16, via a cathode input line 28. The protons react with the oxygen (in the air flow) and the electrons in the respective cathode C to generate water. The electrons from the respective anode A cannot pass through the respective membrane M and are directed through a load to perform work.

Referring to FIG. 1, a cathode output line 32 serves to expel cathode exhaust gas from the fuel cell stack 16. The fuel cell assembly 12 may include a bypass valve 34 in communication with the water vapor transfer unit 30. The bypass valve 34 is adapted to selectively redirect the cathode exhaust gas through or around a water vapor transfer unit 30, for humidifying the cathode input air. Water recovered from the cathode exhaust stream may be returned to the fuel cell stack 16 via the cathode input line 28. Excess water may also be directed to a sink 36. Referring to FIG. 1, the fuel cell stack 16 receives a cooling fluid, referred to herein as stack coolant, through a coolant loop 38 connected to a coolant pump 40. The stack coolant flows through flow channels (not shown) in the fuel cell stack 16.

Fuel cell membranes are operated with a controlled hydration level so that the ionic resistance across the respective membranes M is low enough to effectively conduct protons. Models may be employed to estimate the amount of water in the fuel cell stack 16 based on stack operating parameters during operation of the fuel cell assembly 12. The amount of water in the fuel cell stack 16 may also be evaluated through a high frequency resistance circuit 42, which measures the high frequency resistance of the respective membranes M. The resistance of the high frequency component indicates the cell membrane humidification level X. of the fuel cell stack 16.

At shutdown or startup of the fuel cell assembly 12, it is desirable that the respective membranes M have a hydration level within a specific range, such that they are not either too wet or too dry. If the fuel cell stack 16 has too much water in it from the previous shutdown, the water generated during a long startup may block gas flow channels in the fuel cell stack 16. The excess water may be removed by purging the fuel cell stack 16, with air flow being passed through the fuel cell stack 16 and flow fields. Water vapor is then transferred from the wet/humidified membrane to the dry air flow through diffusion resulting in the respective membranes M becoming dry. However, too long of a purge could cause the respective membranes M to become too dry and have too low of a protonic conductivity at the next system restart that affects restart performance as well as reduces the durability of the fuel cell stack 16.

Referring to FIG. 1, the system 10 includes a controller 50 having at least one processor 52 and at least one memory 54 (or non-transitory, tangible computer readable storage medium) on which instructions are recorded for executing a method 100 for controlling a purge operation of the fuel cell assembly 12. Method 100 is described below with respect to FIG. 2. The memory 54 may store executable instruction sets, and the processor 52 may execute the instruction sets stored in the memory 54.

Figure 2:
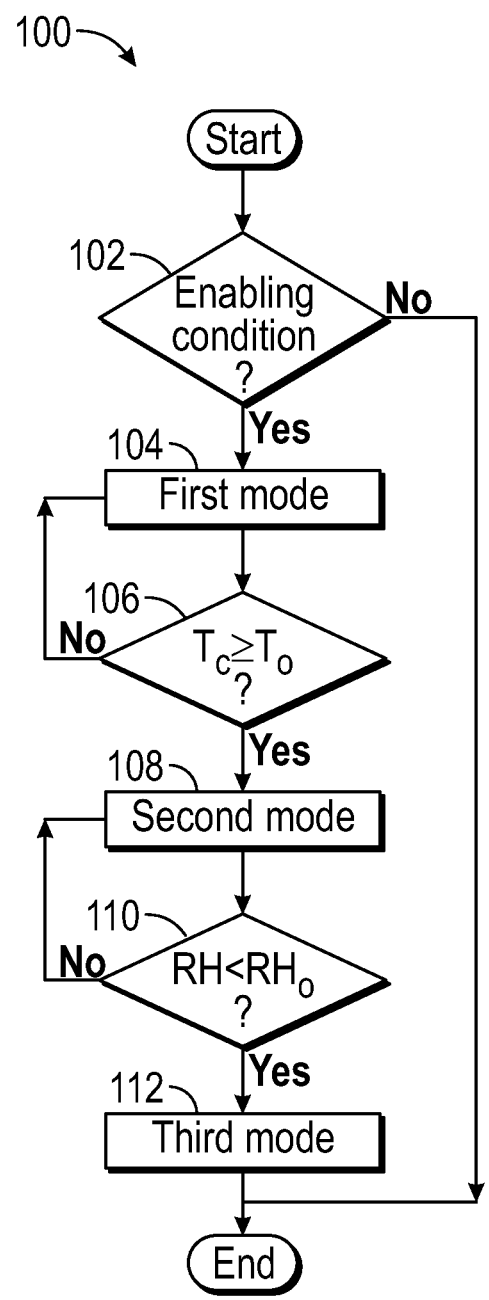
FIG. 2 is a flowchart for a method executable by the controller of FIG. 1.

The method 100 of FIG. 2 may be implemented during a shutdown of the fuel cell assembly 12 or during a freeze purge startup process. A freeze purge is an extended purge that occurs when the device 14 is keyed off, with the purge being executed as a part of the shutdown. As the water is pushed out of the flow channels in the fuel cell stack 16 during the purge, a saturated membrane will cause more water to flow into the channels that will then need to also be purged out. A freeze purge is more robust than a short quick purge that removes bulk liquid water from the flow channels of the fuel cell stack 16 that is performed at every shutdown unless the freeze purge is performed.

The controller 50 is specifically configured to execute the blocks of method 100 and may receive input from one or more sensors S configured to obtain respective sensor data, as shown in FIG. 1. The sensors S may include a first sensor 44 providing a temperature measurement of the fuel cell stack 16 and a second sensor 46 for relative humidity. The sensors S may include a third sensor 48 providing an ambient temperature measurement. It is to be understood that the sensors S may include other devices for measuring current, voltage and other variables not listed herein. It should be noted that the temperature, pressure and other parameters may be quantified in other ways, including via "virtual sensing" and modeling based on other measurements and using sensors S at other locations. For example, a virtual temperature sensor modeling output, ambient temperature and conditions within the airflow may be employed to estimate coolant temperature.

While performing a purge to reduce the amount of water in the respective membranes M is desirable, too much drying has an adverse effect on membrane durability. Using the integrated purge strategy described herein allows the system 10 to balance these goals while also reducing reduce shutdown time significantly. The first purge mode of the method 100 involves a relatively low cathode stoichiometric ratio, which is considered to be a "wet" operating point. The cathode stoichiometric ratio is defined as the ratio of the flow of oxygen supplied to the fuel cell stack 16 and the current generated by the fuel cell stack 16 (i.e., the flow of oxygen consumed by the fuel cell stack 16). During a normal fuel cell stack operation, the compressor 26 may provide enough air to include about twice the amount of oxygen needed for a particular desired stack current density, which is called a cathode stoichiometric ratio of 2.

The idea of using a "wet" operating point is counterintuitive because a purge is normally associated with higher cathode stoichiometric ratio or higher airflow to dry out the water in the fuel cell stack 16. In addition to the relatively low cathode stoichiometric ratio, the first purge mode described below is run until a relatively high temperature (in some embodiments, about 85 degrees Celsius) is achieved in order to evaporate the water and minimize its accumulation.

Referring now to FIG. 2, a flowchart of the method 100 is shown. The method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 2, the controller 50 is configured to determine if at least one of a first enabling condition and a second enabling condition is met, based in part on the respective sensor data. If either of the first enabling condition and a second enabling condition is met, the method 100 proceeds to block 104. If not, the method 100 is ended. The first enabling condition may be met when the ambient temperature at shutdown (of the fuel cell assembly 12 and/or the device 14) is less than an ambient threshold temperature. In one example, the ambient threshold temperature is about −12 to −18 degrees Celsius. The second enabling condition may be met when the coolant temperature at a wakeup of the of the fuel cell assembly 12 and/or the device 14 is less than a minimum coolant temperature. The minimum coolant temperature may be about 5 degrees Celsius. In one example, the minimum coolant temperature is between about 3 degrees Celsius and 7 degrees Celsius.

Per block 104 of FIG. 2, the controller 50 is configured to execute a first purge mode defining a first group of setpoints, including a relatively low cathode stoichiometric ratio. In some embodiments, the relatively low cathode stoichiometric ratio is approximately 1. The relatively low cathode stoichiometric ratio may be between about 0.8 to 1.2.

Per block 106 of FIG. 2, the controller 50 is configured to determine if the coolant temperature (Tc) has reached a minimum warm-up temperature (To). If so, the method 100 proceeds to block 108. If not, the method 100 loops back to block 104. In one example, the minimum coolant temperature is about 85 degrees Celsius.

Per block 108 of FIG. 2, the method 100 includes switching to a second purge mode defining a second group of setpoints, including a relatively high cathode stoichiometric ratio. In some embodiments, the relatively high cathode stoichiometric ratio is approximately 10. The relatively high cathode stoichiometric ratio may be between about 9.5 to 10.5. The first group of setpoints and the second group of setpoints include a respective current setpoint, a respective stack airflow setpoint, and a respective compressor airflow setpoint. In some embodiments, the respective current setpoint is about 55 to 65 amperes for the first purge mode and about 35 to 45 amperes for the second purge mode. The respective stack airflow setpoint may be about 3 to 7 grams per second for the first purge mode and about 45 to 55 grams per second for the second purge mode. The respective compressor airflow setpoint for both the first purge mode and the second purge mode may be about 45 to 55 grams per second.

These setpoints may be calibrated through a number of methods, online and offline. Referring to FIG. 1, a current density circuit board 62 (having a plurality of cells 64) may be adapted to set calibration values offline, prior to the fuel cell stack 16 being installed in the device 14. The current density circuit board 62 generates a current distribution through the fuel cell stack 16 from an inlet end 66 to an outlet end 68. The current distribution may be employed to set calibration values for the respective current setpoint and the respective stack airflow setpoint for the first purge mode and the second purge mode. The calibration values may be set online via the high frequency resistance circuit 42 (see FIG. 1), with the respective resistance measurements employed to validate an end of purge calibration.

Per block 110 of FIG. 2, the controller 50 is configured to determine if a relative humidity (RH) at the cathode output falls blow a threshold humidity ($RH_0$). If so, the method 100 moves to block 112, otherwise it loops back to block 108. Per block 112 of FIG. 2, the controller 50 is configured to switch to a third mode when the relative humidity at the cathode output falls below a threshold humidity. In some embodiments, the third mode is a shutdown mode of the fuel cell assembly 12 and/or device 14. In other embodiments, the third mode is a startup mode of the fuel cell assembly 12 and/or device 14. In some embodiments, the third mode includes the controller 50 going to a sleep mode. The method 100 is then ended.

Figure 3:
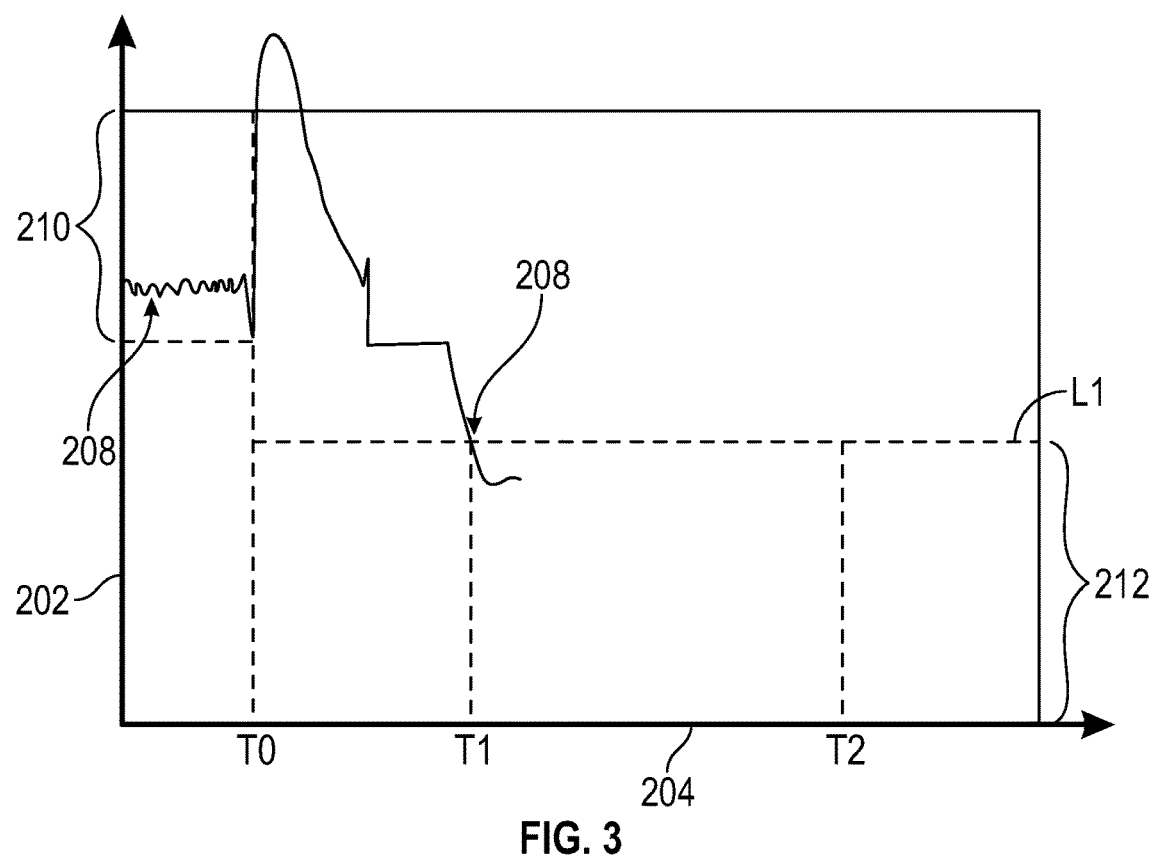
FIG. 3 is a schematic graph showing relative humidity (in percentage) at a cathode output line for an example fuel cell stack on the vertical axis and time on the horizontal axis.

Referring now to FIG. 3, an example graph of relative humidity for the fuel cell stack 16 is shown. The vertical axis 202 shows relative humidity (in percentage) at the cathode output line 32 and the horizontal axis 204 shows time. Time T0 in FIG. 3 coincides with a key-off time of the device 14. Trace 208 is an example implementation of the integrated purge strategy described above. The first humidity range 210 reflects a (run time) relative humidity range that meets durability targets. The second humidity range 212 reflects a (run time) relative humidity range that meets acceptable freeze start requirements. Trace 208 crosses the upper boundary L1 of the second humidity range 212 at time T1. The time T1 is relatively faster than a time T2 when a typical purge strategy many meet acceptable freeze start requirements. In other words, the integrated purge strategy described above results in time savings while meeting both durability and acceptable freeze start requirements.

Figure 4:
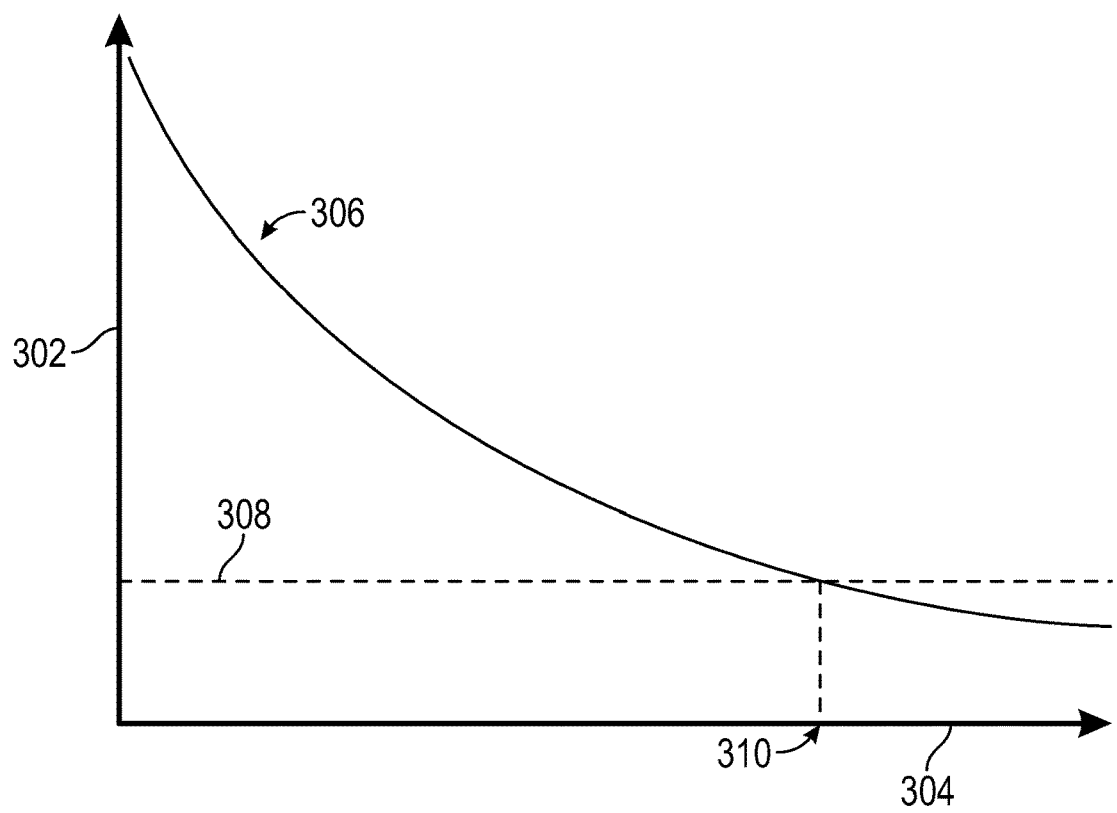
FIG. 4 is a schematic graph showing a steady-state relative humidity (in percentage) at the cathode output line on the vertical axis and coolant temperature on the horizontal axis.

FIG. 4 shows a schematic example trace 306 of steady-state relative humidity for the fuel cell stack 16. The vertical axis 302 shows relative humidity (in percentage) at the cathode output line 32 and the horizontal axis 304 shows coolant temperature. In this example, line 308 indicates a relative humidity level of 100%. The trace 306 intersects the line 308 at a coolant temperature 310, which may be selected to the minimum warm-up temperature for the stack coolant. In one example, the coolant temperature 310 is about 85 degrees Celsius.

Referring to FIG. 1, the sensors S may be in communication with the controller 50 via a network 60, which may be a short-range network or a long-range network. The network 60 may be a communication BUS, which may be in the form of a serial Controller Area Network (CAN-BUS). The network 60 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of connections may be employed.

The integrated purge strategy described above, with a bifurcated mode of cathode stoichiometric ratios, maintains hydration levels of the respective membranes M in the fuel cell stack 16, while extending their durability. The system 10 reduces freeze shutdown time for acceptable freeze starts. The system 10 may reduce higher air flow for a large duration of freeze purge. The system 10 (via execution of the method 100) provides an efficient way to control purge operation of the fuel cell assembly 12, thereby improving the functioning of the device 14.

The controller 50 may be an integral portion of, or a separate module operatively connected to, other controllers of the device 14. The controller 50 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical and physical media with patterns of holes, a RAM, a PROM, an EPROM, a FLASH-EEPROM, other memory chips or cartridges, or other media from which a computer may read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 2 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model. A parameter may have a discrete value, e.g., either "1" or "0", or may be infinitely variable in value.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling a purge operation of a fuel cell assembly, the system comprising:

a fuel cell stack configured to receive a stack coolant;

one or more sensors configured to obtain respective sensor data, including a coolant temperature of the stack coolant and an ambient temperature;
a controller in communication with the one or more sensors and having a processor and a tangible, non-transitory memory on which instructions are recorded, execution of the instructions by the processor causing the controller to:
execute a first purge mode when the ambient temperature at a shutdown of the fuel cell assembly is less than an ambient threshold temperature and/or when the coolant temperature at a wakeup of the fuel cell assembly is less than a minimum coolant temperature;
execute a second purge mode when the coolant temperature is above a minimum warm-up temperature; and
wherein a respective cathode stoichiometric ratio during the first purge mode is lower than the respective cathode stoichiometric ratio during the second purge mode.

2. The system of claim 1, wherein the respective cathode stoichiometric ratio is about 0.9 to 1.1 during the first purge mode and the respective cathode stoichiometric ratio is about 9.5 to 10.5 during the second purge mode.

3. The system of claim 2, wherein the minimum warm-up temperature is about 85 degrees Celsius.

4. The system of claim 1, wherein the ambient threshold temperature is about −12 to −18 degrees Celsius.

5. The system of claim 1, wherein the minimum coolant temperature is about 3 degrees Celsius to 7 degrees Celsius.

6. The system of claim 1, wherein the first purge mode and the second purge mode respectively define a first group of setpoints and a second group of setpoints each including a respective current setpoint, a respective stack airflow setpoint, a respective stack temperature setpoint and a respective compressor airflow setpoint.

7. The system of claim 6, wherein the respective current setpoint is about 55 to 65 amperes for the first purge mode and about 35 to 45 amperes for the second purge mode.

8. The system of claim 6, wherein the respective stack airflow setpoint is about 3 to 7 grams per second for the first purge mode and about 45 to 55 grams per second for the second purge mode.

9. The system of claim 6, wherein the respective compressor airflow setpoint for both the first purge mode and the second purge mode is about 45 to 55 grams per second.

10. The system of claim 6, further comprising:
a current density circuit board adapted to generate a current distribution through the fuel cell stack from an inlet end to an outlet end; and
wherein the current distribution is employed to set calibration values for the first group of setpoints and the second group of setpoints.

11. The system of claim 6, further comprising:
a high frequency resistance circuit adapted to generate respective resistance measurements of respective membranes in the fuel cell stack; and
wherein the respective resistance measurements are employed to set respective calibration values for the first group of setpoints and the second group of setpoints.

12. The system of claim 1, wherein the controller is adapted to execute a third mode when a relative humidity value of a stack cathode output falls below a threshold humidity, the third mode including a shutdown mode of the fuel cell assembly.

13. The system of claim 1, wherein the controller is adapted to execute a third mode when a relative humidity value of a stack cathode output falls below a threshold humidity, the third mode including a sleep mode of the controller.

14. A method for controlling a purge operation of a fuel cell assembly having a fuel cell stack configured to receive a stack coolant, one or more sensors and a controller having a processor and a tangible, non-transitory memory, the method comprising:
obtaining respective sensor data, via the one or more sensors, including a coolant temperature of the stack coolant and an ambient temperature;
executing a first purge mode when the ambient temperature at a shutdown of the fuel cell assembly is less than an ambient threshold temperature and/or when the coolant temperature at a wakeup of the fuel cell assembly is less than a minimum coolant temperature via the controller;
executing a second purge mode when the coolant temperature is above a minimum warm-up temperature, via the controller; and
setting a respective cathode stoichiometric ratio during the first purge mode to be lower than the respective cathode stoichiometric ratio during the second purge mode.

15. The method of claim 14, further comprising:
selecting the respective cathode stoichiometric ratio to be about 0.8 to 1.2 during the first purge mode, the respective cathode stoichiometric ratio to be about 9.5 to 10.5 during the second purge mode and the minimum warm-up temperature to be about 83 to 87 degrees Celsius.

16. The method of claim 15, further comprising:
generating a current distribution through the fuel cell stack from an inlet end to an outlet end, via a current density circuit board, wherein the first purge mode and the second purge mode respectively define a first group of setpoints and a second group of setpoints, including a respective current setpoint; and
employing the current distribution to set respective calibration values for the first group of setpoints and the second group of setpoints.

17. The method of claim 15, further comprising:
generating respective resistance measurements of respective membranes in the fuel cell stack, via a high frequency resistance circuit, wherein the first purge mode and the second purge mode respectively define a first group of setpoints and a second group of setpoints, including a respective current setpoint; and
employing the respective resistance measurements to set respective calibration values for the first group of setpoints and the second group of setpoints.

\* \* \* \* \*